No. 889,424. PATENTED JUNE 2, 1908.
S. H. ADAMS.
SPRAYING NOZZLE.
APPLICATION FILED APR. 23, 1907.

Witnesses:
J. H. Alfords
W. H. Hall

Inventor:
Samuel Henry Adams
by Poole & Brown
Attys

UNITED STATES PATENT OFFICE.

SAMUEL HENRY ADAMS, OF FULFORD, NEAR YORK, ENGLAND.

SPRAYING-NOZZLE.

No. 889,424.  Specification of Letters Patent.  Patented June 2, 1908.

Application filed April 23, 1907. Serial No. 369,875.

*To all whom it may concern:*

Be it known that I, SAMUEL HENRY ADAMS, a subject of the King of Great Britain, and a resident of Fulford, near York, in the county of York, England, have invented certain new and useful Improvements in Spraying-Nozzles; and I do hereby declare that the following is a full, clear, and exact description thereof, reference being had to the accompanying drawings, and to the letters of reference marked thereon, which form a part of this specification.

This invention relates to improvements in spraying nozzles and refers more specifically to a novel form of spraying nozzle designed to distribute liquid from a central point of emission over a rectangular or right-sided area, whereby said nozzles may be arranged to distribute liquid uniformly over all parts of a given area.

A practical adaptation of my improved nozzle is its use for distributing liquid sewage upon a filter bed of a sewage purification plant, wherein the liquid is discharged upon said bed through a plurality of branches connected with distributing or lead pipes extending across or over the bed. A construction of filter in common use for this purpose consists of a body of relatively coarse material through which the fluid discharged thereon passes rapidly, and by reason of such fact it becomes desirable to distribute said liquid uniformly over the bed in order that the liquid may percolate through all parts of the bed with substantially uniform effect.

Figure 1:
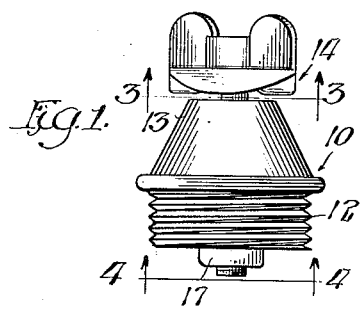
Figure 2:
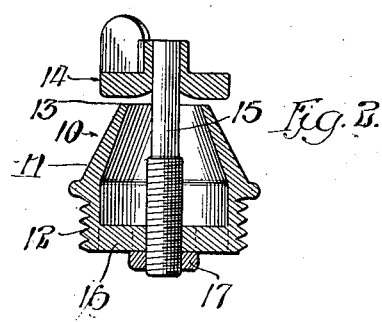
Figure 3:
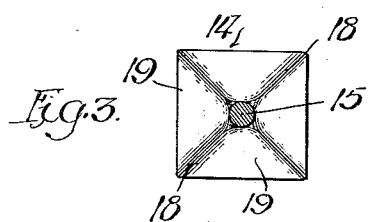
Figure 4:
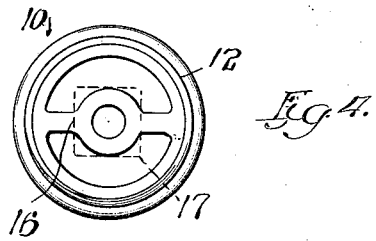
Figure 5:
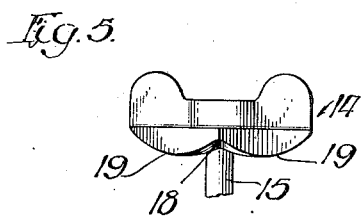
Figure 6:
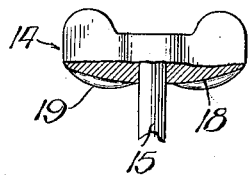
Figure 7:
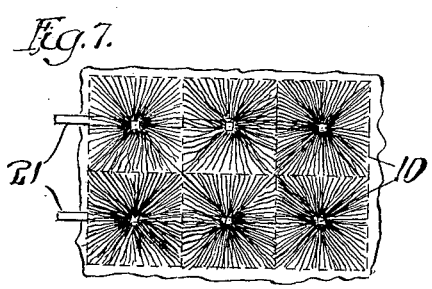
Figure 8:
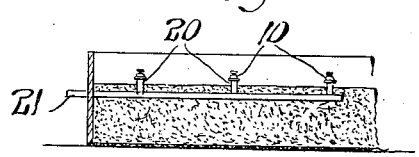

In the drawings:—Figure 1 is a side elevation of a nozzle embodying my invention. Fig. 2 is an axial section thereof. Fig. 3 is a cross-section, taken on line 3—3 of Fig. 1. Fig. 4 is an end view of the nozzle. Figs. 5 and 6 are side elevations of the spraying head as seen from two positions of the part. Figs. 7 and 8 are fragmentary plan view and vertical sections, respectively, of a filter bed showing one application of my improved nozzle.

As shown in the drawings, 10 designates as a whole my improved nozzle. It comprises a hollow casing or shell 11 that is formed with a cylindric, screw-threaded end 12 for attachment to a distributing pipe and with a tapered upper or discharge end 13. 14 designates the spraying head of said nozzle which is made of suitable form in plan view and located a distance in advance of the discharge opening of the shell to provide a space between the head and shell for the discharge of liquid. The liquid issuing from said shell impinges against the inner face of said head whereby the liquid is deflected and thrown outwardly or sprayed over an area surrounding the nozzle of which area the nozzle is the center. The said head is fixed to the shell of the nozzle by means of a shank 15 that extends inwardly through the discharge end of the shell and through an opening in a cross-bar 16 located within the shell and extending from side to side thereof. The said shank 15 is screw-threaded and engages a screw-thread in the said opening of the cross-bar 16, whereby the head may be adjusted at varying distances from the discharge end of said shell to vary the volume of liquid discharged from the nozzle. A lock-nut 17 engages said screw-threaded end of the shank and is adapted to be turned upwardly against said cross-bar to lock the shank and head in adjusted positions.

The inner or deflecting face of the nozzle head is broken, or disposed with its parts arranged at varying angles to a plane perpendicular to the central axis of the head, so as to present different angles of deflection to the jet of liquid striking it as the liquid issues from the discharge end of the nozzle shell; and the angular disposition of the various parts of said deflecting face of the head is such that the liquid deflected from certain parts of said face is thrown farther from the nozzle than that deflected from other parts of said face, with the result of producing a spray or jet which covers a horizontal rectangular area. If the deflecting face of the nozzle head be flat or of other like symmetrical form the spray issuing therefrom will cover a circular area. The result mentioned is attained in the present instance by forming said deflecting face with four grooves 18 that extend from the center of the head radially to the margins thereof, and at such angles with respect to a plane perpendicularly intersecting the shank of the head and with respect to the areas 19 of the deflecting face between said grooves that the liquid deflected from the grooved portions of said face is discharged at a higher angle than that deflected from the intermediate areas 19 of the face. As a result the liquid issuing from the grooved portions of the deflecting faces is thrown fartherest from the nozzle. The triangular intermediate portions 19 of the deflecting face are convexly curved between adjacent grooves 18, whereby the angle of deflection gradually increases from the median lines of said intermediate portions to the highest parts of the grooves at each side thereof. At the median lines of said triangular intermediate portions the jet is thrown laterally from the deflecting face at a substantial right angle to the axis of the nozzle, and the angle from the horizontal at which the liquid issues from the nozzle gradually increases to the highest angles of the face or those represented by the bottoms of said grooves. The said grooves are located 90 degrees apart so that the portions of the jet or spray issuing from these parts of the deflecting face are thrown towards the corners of the rectangular area covered by the spray. As a result of this arrangement, if the nozzles be disposed symmetrically with respect to each other on parallel transverse lines as shown in Fig. 7, the area supplied with the fluid from each nozzle is that of a rectangle and the adjacent sides of such rectangular areas coincide in such manner that the entire area covered by a plurality of nozzles is substantially uniformly supplied with liquid.

In the adaptation of my improved nozzle to the percolating filter of a sewage purifying plant, the nozzles are attached to the discharge ends of branch pipes 20 extending upwardly or downwardly from lead or distributing pipes 21 that receive the fluid from the dosing tank or other suitable distributing part of the system. In the present instance, the branch pipes are shown as extending upwardly from the filter bed and the lead or distributing pipes are buried in the bed to avoid freezing of the contents thereof. In some instances, the lead pipes are suspended over the bed and the branch pipes extend downwardly therefrom. In the latter case the nozzles are attached to the lower ends of said branch-pipes. In the latter event also the deflecting faces of the nozzle-heads will be reversed or modified to conform to the different direction of flow of the liquid from the discharge pipes or branches.

I claim as my invention:—

1. A spraying nozzle provided with a stationary spraying head having a downwardly directed face formed with upwardly and outwardly inclined, symmetrically arranged radial grooves and intervening triangular surfaces, said intervening triangular surfaces being convexly curved, for the purpose set forth.

2. A spraying nozzle comprising a shell and a stationary spraying head located in advance of the discharge opening of the shell and provided on its inner side with a deflecting face formed with upwardly and outwardly inclined symmetrically arranged radial grooves, and intervening triangular surfaces, said intervening triangular surfaces being convexly curved and means for adjusting said head toward and from the discharge opening of the shell.

In testimony, that I claim the foregoing as my invention I affix my signature in the presence of two witnesses, this 10th day of April, A. D. 1907.

SAMUEL HENRY ADAMS.

Witnesses:
GEORGE HARRISON,
CONRAD K. FALKENSTEIN.